(12) United States Patent
Avivi et al.

(10) Patent No.: US 8,830,972 B2
(45) Date of Patent: Sep. 9, 2014

(54) METHOD AND APPARATUS FOR ADAPTIVE MITIGATION OF NOISE INTERFERENCE

(75) Inventors: Rotem Avivi, Petah-Tiqwa (IL); Tzahi Weisman, Mevaseret Zion (IL)

(73) Assignee: Intel Corporation, Santa Clara, CA (US)

(*) Notice: Subject to any disclaimer, the term of this patent is extended or adjusted under 35 U.S.C. 154(b) by 67 days.

(21) Appl. No.: 13/192,255

(22) Filed: Jul. 27, 2011

(65) Prior Publication Data

US 2013/0028244 A1 Jan. 31, 2013

(51) Int. Cl.
*H04W 4/00* (2009.01)
*H04B 17/00* (2006.01)
*H04L 25/03* (2006.01)
*H04B 1/10* (2006.01)
*H04B 15/04* (2006.01)

(52) U.S. Cl.
CPC ...... *H04B 17/0055* (2013.01); *H04L 25/03299* (2013.01); *H04L 25/03993* (2013.01); *H04B 1/1027* (2013.01); *H04B 15/04* (2013.01)
USPC .................................................... 370/338

(58) Field of Classification Search
USPC .......... 370/252, 328, 338; 375/346, 347, 267; 455/63.1; 342/159
See application file for complete search history.

(56) References Cited

U.S. PATENT DOCUMENTS

| | | | |
|---|---|---|---|
| 6,141,393 A * | 10/2000 | Thomas et al. | 375/347 |
| 7,012,978 B2 * | 3/2006 | Talwar | 375/346 |
| 7,653,161 B2 | 1/2010 | Peeters et al. | |
| 8,488,724 B2 * | 7/2013 | Daneshrad et al. | 375/346 |
| 2006/0056549 A1 * | 3/2006 | Arslan et al. | 375/346 |
| 2008/0225781 A1 * | 9/2008 | Prasad et al. | 370/328 |
| 2008/0227397 A1 * | 9/2008 | Prasad et al. | 455/63.1 |
| 2008/0231500 A1 * | 9/2008 | Heikkila et al. | 342/159 |
| 2008/0248773 A1 | 10/2008 | De Carvalho et al. | |
| 2008/0317102 A1 * | 12/2008 | Reial | 375/148 |
| 2009/0086841 A1 * | 4/2009 | Guo et al. | 375/267 |
| 2009/0310724 A1 * | 12/2009 | Shah et al. | 375/346 |
| 2010/0203858 A1 | 8/2010 | Lee et al. | |
| 2010/0303182 A1 * | 12/2010 | Daneshrad et al. | 375/346 |
| 2012/0201152 A1 * | 8/2012 | Yoo et al. | 370/252 |

FOREIGN PATENT DOCUMENTS

WO 2010131818 A1 11/2010

OTHER PUBLICATIONS

International Preliminary Report for PCT Application No. PCT/US2012/045262, dated Feb. 6, 2014, 8 pages.

* cited by examiner

*Primary Examiner* — Chirag Shah
*Assistant Examiner* — Jael Ulysse
(74) *Attorney, Agent, or Firm* — Schwabe, Williamson & Wyatt, P.C.

(57) ABSTRACT

A method and system for adaptive mitigation of noise interference in a receiver. In one embodiment of the invention, the receiver determines the type of the dominant noise interference among one or more noise interferences. The receiver determines or optimizes the estimation and averaging process of the noise covariance matrix based on the type of the dominant noise interference in one embodiment of the invention. This allows dynamic selection and adaptation of the noise estimate covariance matrix based on the noise type in one embodiment of the invention.

20 Claims, 2 Drawing Sheets

METHOD AND APPARATUS FOR ADAPTIVE MITIGATION OF NOISE INTERFERENCE

FIELD OF THE INVENTION

This invention relates to a receiver, and more specifically but not exclusively, to a method and apparatus for adaptive mitigation of noise interference in the receiver.

BACKGROUND DESCRIPTION

In a wireless network, the receiver in a node or station often experiences noise interferences. The demodulation performance of the receiver is dependent on the accuracy of the interference mitigation block which mitigates or whitens the noise interference.

BRIEF DESCRIPTION OF THE DRAWINGS

The features and advantages of embodiments of the invention will become apparent from the following detailed description of the subject matter in which.

DETAILED DESCRIPTION

Figure 1:
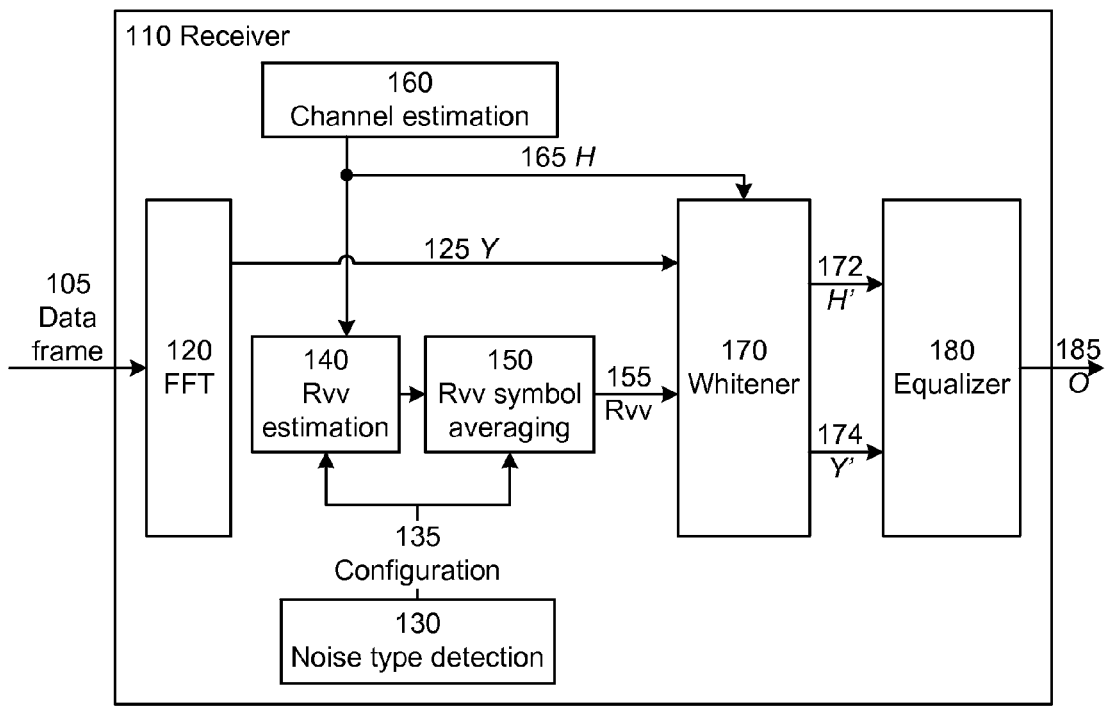
FIG. 1 illustrates a block diagram of a receiver in accordance with one embodiment of the invention.

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment.

Embodiments of the invention provide a method and apparatus for adaptive mitigation of noise interference in a receiver. In one embodiment of the invention, the receiver is part of, but not limited to, an advanced base station (ABS), an advanced mobile station (AMS), a transceiver, a source enhanced base station (eNode B), a target eNodeB, and any other wireless platform.

In one embodiment of the invention, the receiver determines the type of the dominant noise interference among one or more noise interferences. The receiver determines or estimates a noise covariance matrix based on the type of the dominant noise in one embodiment of the invention. The noise covariance matrix is based on the spatial correlation of the noise/interference between the receive antennas in the receiver in one embodiment of the invention.

The receiver uses the determined noise covariance matrix to whiten or reduce the dominant noise in one embodiment of the invention. As the noise covariance matrix is estimated based on the type of the dominant noise interference, the accuracy of estimated noise covariance matrix is improved. This allows the receiver to enhance its demodulation performance under different types of noise in one embodiment of the invention.

In one embodiment of the invention, the characteristics of the noise interferences are classified into two types. The first type of noise is internal noise that originates from a platform with the receiver in one embodiment of the invention. In one embodiment of the invention, the noise that originates from the platform with the receiver are termed as platform noise. The platform noise includes, but is not limited to, a clock noise, a spur noise, a thermal noise, and any other noise interference from other component(s) on the platform.

The platform includes, but is not limited to, a wireless electronic device such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices.

The second type of noise is external noise interferences that originate outside the platform with the receiver in one embodiment of the invention. In one embodiment of the invention, the noise interferences that originate outside the platform with the receiver are termed as non-platform noise. The non-platform noise includes, but is not limited to, an external noise from an interferer base station or mobile station in the same network as the platform.

FIG. 1 illustrates a block diagram 100 of a receiver 110 in accordance with one embodiment of the invention. The receiver 110 has a Fast Fourier Transform (FFT) module that transforms a time based data frame 105 into the frequency domain signals Y 125 in one embodiment of the invention. The receiver 110 has a noise type detection module 130 to detect the dominant type of noise type that affects the receiver 110 in one embodiment of the invention. In one embodiment of the invention, each time based data frame 105 is divided into N Orthogonal Frequency Division Multiplexing (OFDM) symbols. N is an integer value in one embodiment of the invention. Each OFDM symbol has K tones in one embodiment of the invention. For example, K is an integer value of 256, 512, 1024, or any other integer value in one embodiment of the invention.

For example, in one embodiment of the invention, both the platform noise and the non-platform noise interference are present in the receiver 110 and the noise type detection module 130 determines whether the platform noise or the non-platform noise interference is stronger. The noise type detection module 130 sets the stronger noise type as the dominant noise interference in one embodiment of the invention.

For example, the noise type detection module 130 uses the Interference to Noise (INR) ratio of data frame 105 to determine whether the noise type is the platform noise or the non-platform noise interference in one embodiment of the invention. In another embodiment of the invention, the noise type detection module 130 may also use other measurement criterion to determine whether the noise type is the platform noise or the non-platform noise interference and it shall not be described herein.

In one embodiment of the invention, the noise type detection module 130 detects the dominant type of noise that affects the receiver 110 by detecting the noise characteristics of the platform noise interference and the non-platform noise interference. In one embodiment of the invention, the noise type detection module 130 checks whether any spur noise, clock noise, thermal noise are observed in the data frame 105. In one embodiment of the invention, the noise type detection module 130 checks whether any noise from other station(s) is observed in the data frame 105. This allows the noise type detection module 130 to determine the dominant noise interference that affects the receiver 110.

In one embodiment of the invention, the noise type detection module 130 is coupled with the noise covariance matrix (Rvv) estimation module 140 and the Rvv symbol averaging module 150. The noise type detection module 130 sends configuration signals 135 to the Rvv estimation module 140 and the Rvv symbol averaging module 150 based on the determined type of noise in one embodiment of the invention.

For example, in one embodiment of the invention, at the start of the reception of the data frame 105, the noise type detection module 130 detects the dominant type of noise interference that affects the receiver 110. When the noise type detection module 130 determines that the platform noise is the dominant noise interference, it sends the configuration signals 135 to configure the Rvv estimation module 140 and the Rvv symbol averaging module 150 to generate the noise covariance matrix (Rvv) 155 that is optimized for the platform noise interference in one embodiment of the invention.

In one embodiment of the invention, the platform noise is relatively static compared to the non-platform noise interference. When the noise type detection module 130 determines that the platform noise is the dominant noise interference, it configures the Rvv estimation module 140 and the Rvv symbol averaging module 150 to estimate the noise interference on every tone (in frequency domain) of the OFDM symbol that belongs to the data frame 105. In another embodiment of the invention, the noise type detection module 130 configures the Rvv estimation module 140 and the Rvv symbol averaging module 150 to estimate the noise on substantially every tone (in frequency domain) of the OFDM symbol that belongs to the data frame 105 when the platform noise interference is determined as the dominant noise interference.

For example, in one embodiment of the invention, the noise type detection module 130 configures the Rvv estimation module 140 and the Rvv symbol averaging module 150 to estimate the noise from the preamble of the data frame 105 when the platform noise is determined as the dominant noise interference.

In one embodiment of the invention, the noise type detection module 130 estimates the noise once per data frame received by the receiver 110 when the platform noise is determined as the dominant noise interference.

In one embodiment of the invention, as the platform noise is relatively static, the noise type detection module 130 is not required to keep estimating the noise for the duration of the OFDM symbol and it estimates the noise once per data frame received by the receiver 110 when the platform noise is determined as the dominant noise type. In another embodiment of the invention, the noise type detection module 130 may use a different unit interval to estimate the noise type when the platform noise is determined as the dominant noise interference.

In one embodiment of the invention, the noise type detection module 130 configures the Rvv estimation module 140 and the Rvv symbol averaging module 150 to use a high tones resolution (in frequency domain) such as every tone in frequency domain (for example 10 Khz) to estimate the noise when the platform noise is determined as the dominant noise type. This high tones resolution allows narrow band noises such as spur noises to be removed or mitigated in one embodiment of the invention.

When the noise type detection module 130 determines that the non-platform noise is the dominant noise type, it sends the configuration signals 135 to configure the Rvv estimation module 140 and the Rvv symbol averaging module 150 to generate the noise covariance matrix (Rvv) 155 to be optimized for the non-platform noise interference in one embodiment of the invention.

In one embodiment of the invention, as the non-platform noise interference is relatively dynamic compared to the platform noise interference, the noise type detection module 130 configures the Rvv estimation module 140 to estimate the noise only once every several tones (in frequency domain) of the OFDM symbol that belongs to the data frame 105 when the non-platform noise interference is determined as the dominant noise type. For example, in one embodiment of the invention, the noise type detection module 130 configures the Rvv estimation module 140 to estimate the noise on every $3^{rd}$ tone of the preamble (or any other OFDM symbol) in the frequency domain. The noise type detection module 130 configures the Rvv estimation module 140 to estimate the noise using other tone intervals in the frequency domain of the OFDM symbol that belongs to the data frame 105 in another embodiment of the invention when the non-platform noise interference is determined as the dominant noise interference.

In one embodiment of the invention, as the non-platform noise interference is relatively dynamic compared to the platform noise, the noise type detection module 130 configures the Rvv estimation module 140 to estimate the noise on duration of one or several OFDM symbols when the non-platform noise interference is determined as the dominant noise interference. In one embodiment of the invention, the noise type detection module 130 configures the Rvv estimation module 140 to estimate the noise from the pilots tones of the OFDM symbol that belongs to the data frame 105 when the non-platform noise interference is determined as the dominant noise interference.

In one embodiment of the invention, the noise type detection module 130 configures the Rvv estimation module 140 and the Rvv symbol averaging module 150 to use a medium tones resolution such as every pilot tone (or 100 kHz) to estimate the noise covariance matrix when the non-platform noise interference is determined as the dominant noise interference.

The receiver 110 has a channel estimation module 160 that provides channel estimation values H 165 to the Rvv estimation module 140 and the whitener module 170. The whitener module 170 uses the noise covariance matrix (Rvv) 155 to reduce or mitigate the noise interference in the frequency domain signals Y 125 to generate the whitened frequency domain signals Y' 174 in one embodiment of the embodiment. Similarly, the whitener module 170 uses the noise covariance matrix (Rvv) 155 to reduce or mitigate the noise interference in the channel estimation values H 165 to generate the whitened channel estimation values H' 172 in one embodiment of the invention.

The equalizer module 180 performs an equalization operation of the whitened frequency domain signals Y' 174 using the whitened channel estimation values H' 172 to produce the output 185. The illustration of the receiver 110 is not meant to be limiting and the modules in the receiver 110 can be combined in another embodiment of the invention.

In one embodiment of the invention, the receiver 110 communicates at least in part in accordance with communication standards such as, but are not limited to, Institute of Electrical and Electronic Engineers (IEEE) 802.11(a), 802.11(b), 802.11(g), 802.11(h), 802.11(j), 802.11(n), 802.16-2004, 802.16(e), 802.16(m) and their variations and evolutions thereof standards, and/or proposed specifications, although the scope of the invention is not limited in this respect as they may also be suitable to transmit and/or receive communications in accordance with other techniques and standards.

In one embodiment of the invention, the receiver 110 communicates at least in part in accordance with communication standard such as, but is not limited to, the Third Generation Partnership Project (3GPP) Long Term Evolution (LTE) standard and their variations and evolutions thereof standards, and/or proposed specifications, although the scope of the invention is not limited in this respect as they may also be suitable to transmit and/or receive communications in accordance with other techniques and standards.

The receiver 110 illustrates multi-radio devices capable of heterogeneous wireless communication by accessing a plurality of wireless networks and/or wired networks. The receiver 110 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, orthogonal frequency-division multiple access (OFDMA), multi-carrier modulation (MDM), and/or other suitable modulation techniques to communicate via wireless communication links.

For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions.

Figure 2:
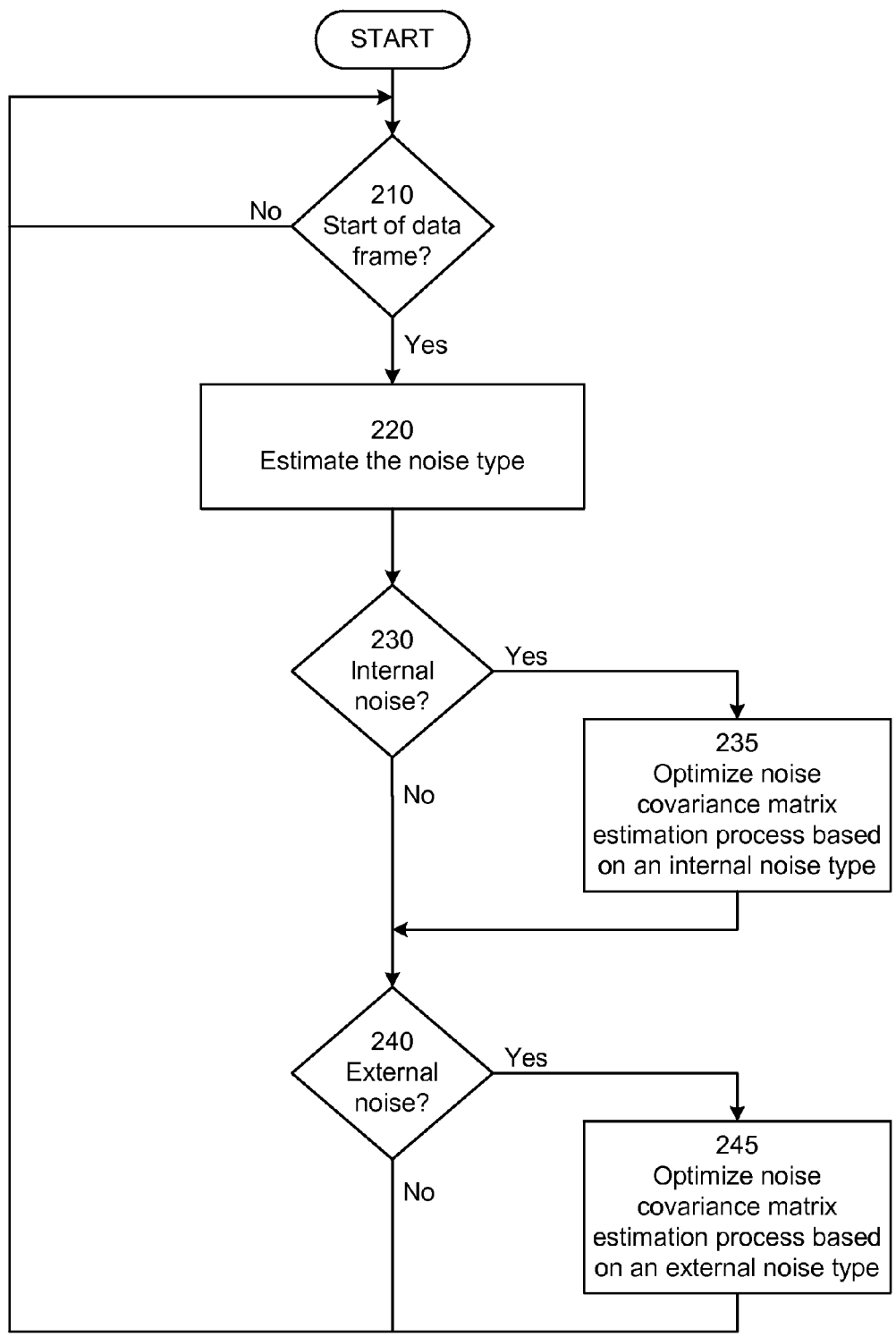
FIG. 2 illustrates a flow chart of the operations of a receiver in accordance with one embodiment of the invention.

FIG. 2 illustrates a flow chart 200 of the operations of a receiver in accordance with one embodiment of the invention. For clarity of illustration, FIG. 2 is discussed with reference to FIG. 1. The flow chart 200 illustrates the operations of the noise type detection module 130 in the receiver 100 in one embodiment of the invention. In step 210, the noise type detection module 130 checks for the start of the data frame 105.

If it is the start of the data frame 105, the flow 200 goes to step 220. If it is not the start of the data frame 105, the flow 200 goes back to step 210. In step 220, the noise type detection module 130 estimates the noise type of the noise. In one embodiment of the invention, the noise type detection module 130 determines whether there is any platform noise and/or non-platform noise interference in step 220.

In step 230, the noise type detection module 130 checks if the noise is an internal noise type in one embodiment of the invention. In one embodiment of the invention, the internal noise interference comprises the platform noise. If the noise is an internal noise interference, the flow 200 goes to step 235. In step 235, the noise type detection module 130 optimizes the estimation of the noise covariance matrix, e.g. by setting suitable frequency/time averaging intervals and the flow 200 goes to step 240. For example, in one embodiment of the invention, the noise type detection module 130 optimize the estimation of the noise covariance matrix e.g. by setting the Rvv estimation module 140 and the Rvv symbol averaging 150 with a high density or high resolution frequency averaging (e.g. every tone) intervals and low density or low resolution time averaging intervals (e.g. every data frame) in step 235.

If the noise interference is not an internal noise interference, the flow 200 goes to step 240 and checks if the noise type is an external noise interference. If the noise type is an external noise interference, the flow 200 goes to step 245. In step 245, the noise type detection module 130 optimize the estimation of the noise covariance matrix, e.g. by setting low density or low resolution frequency averaging intervals (e.g. every $3^{rd}$ tone) and high density or high resolution time averaging intervals (e.g. every OFDM symbol). For example, in one embodiment of the invention, the noise type detection module 130 estimates the noise covariance matrix based on the non-platform noise interference in step 245 and the flow 200 goes back to step 210.

The flow 200 is performed by the noise type detection module 130 at the start of each received data frame in one embodiment of the invention. This allows dynamic selection and adaptation of the noise estimation based on the noise type of the noise interference in one embodiment of the invention. One of ordinary skill in the relevant art having the benefit of this disclosure will readily appreciate that the noise type detection module 130 can perform the flow 200 at different intervals without affecting the workings of the invention. For example, in one embodiment of the invention, the noise type detection module 130 performs the flow 200 at every 5th received data frame. In another embodiment of the invention, the noise type detection module 130 performs the flow 200 at a set time interval. In yet another embodiment of the invention, the noise type detection module 130 performs the step 235 when the INR is below a set threshold and performs the step 245 when the INR is above a set threshold.

Figure 3:
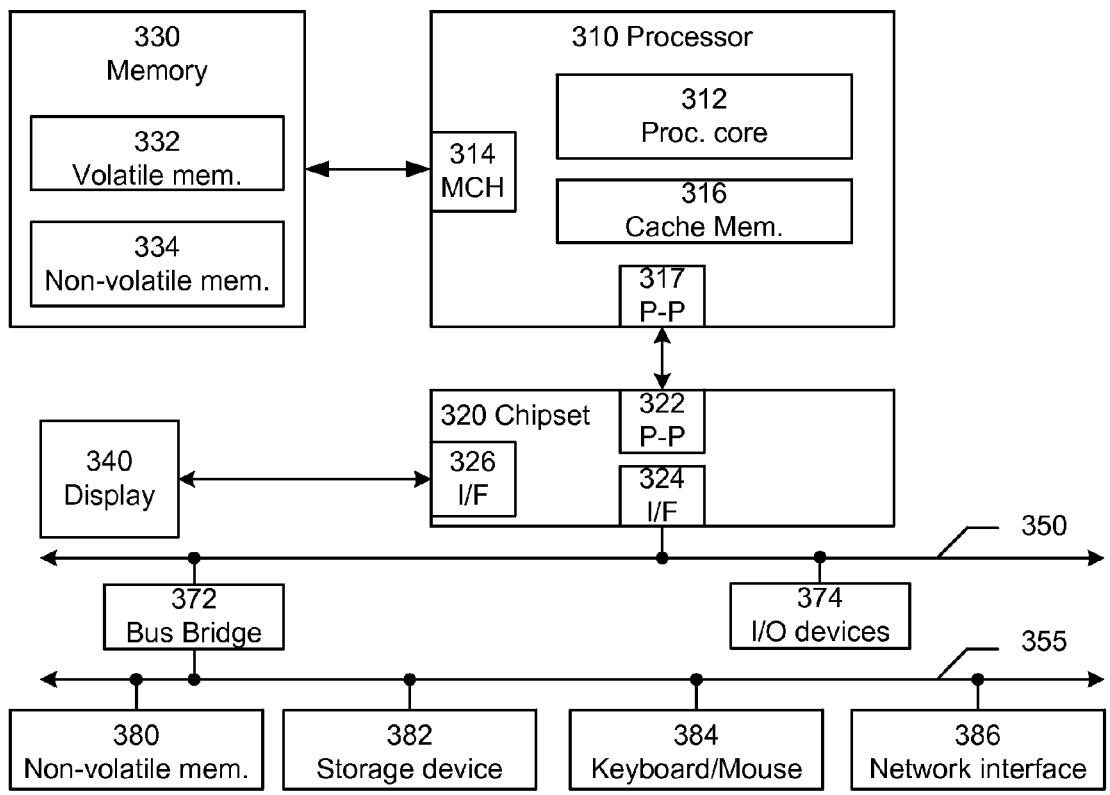
FIG. 3 illustrates a system to implement the methods disclosed herein in accordance with one embodiment of the invention.

FIG. 3 illustrates a system or platform 300 to implement the methods disclosed herein in accordance with one embodiment of the invention. The system 300 includes, but is not limited to, a desktop computer, a laptop computer, a tablet computer, a net book, a notebook computer, a personal digital assistant (PDA), a server, a workstation, a cellular telephone, a mobile computing device, an Internet appliance or any other type of computing device. In another embodiment, the system 300 used to implement the methods disclosed herein may be a system on a chip (SOC) system.

The processor 310 has a processing core 312 to execute instructions of the system 300. The processing core 312 includes, but is not limited to, pre-fetch logic to fetch instructions, decode logic to decode the instructions, execution logic to execute instructions and the like. The processor 310 has a cache memory 316 to cache instructions and/or data of the system 300. In another embodiment of the invention, the cache memory 316 includes, but is not limited to, level one, level two and level three, cache memory or any other configuration of the cache memory within the processor 310.

The memory control hub (MCH) 314 performs functions that enable the processor 310 to access and communicate with a memory 330 that includes a volatile memory 332 and/or a non-volatile memory 334. The volatile memory 332 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 334 includes, but is not limited to, NAND flash memory, phase change memory (PCM), read only memory (ROM), electrically erasable programmable read only memory (EEPROM), or any other type of non-volatile memory device.

The memory 330 stores information and instructions to be executed by the processor 310. The memory 330 may also stores temporary variables or other intermediate information while the processor 310 is executing instructions. The chipset 320 connects with the processor 310 via Point-to-Point (PtP) interfaces 317 and 322. The chipset 320 enables the processor 310 to connect to other modules in the system 300. In one embodiment of the invention, the interfaces 317 and 322 operate in accordance with a PtP communication protocol such as the Intel® QuickPath Interconnect (QPI) or the like. The chipset 320 connects to a display device 340 that includes, but is not limited to, liquid crystal display (LCD), cathode ray tube (CRT) display, or any other form of visual display device.

In addition, the chipset 320 connects to one or more buses 350 and 355 that interconnect the various modules 374, 380, 382, 384, and 386. Buses 350 and 355 may be interconnected together via a bus bridge 372 if there is a mismatch in bus speed or communication protocol. The chipset 320 couples with, but is not limited to, a non-volatile memory 380, a mass storage device(s) 382, a keyboard/mouse 384 and a network interface 386. The mass storage device 382 includes, but is not limited to, a solid state drive, a hard disk drive, an universal serial bus flash memory drive, or any other form of computer data storage medium. The network interface 386 is implemented using any type of well known network interface standard including, but not limited to, an Ethernet interface, a universal serial bus (USB) interface, a Peripheral Component Interconnect (PCI) Express interface, a wireless interface and/or any other suitable type of interface. In one embodiment of the invention, the network interface 386 has the receiver 110 as part of its wireless interface.

While the modules shown in FIG. 3 are depicted as separate blocks within the system 300, the functions performed by some of these blocks may be integrated within a single semiconductor circuit or may be implemented using two or more separate integrated circuits. For example, although the cache memory 316 is depicted as a separate block within the processor 310, the cache memory 316 can be incorporated into the processor core 312 respectively. The system 300 may include more than one processor/processing core in another embodiment of the invention.

The methods disclosed herein can be implemented in hardware, software, firmware, or any other combination thereof. Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. An apparatus comprising:
a receiver to:
determine a dominant noise type of a dominant noise among one or more noise interferences,
when the dominant noise type is determined to be platform noise that originates from the apparatus, estimate a noise covariance matrix using a first frequency interval between frequencies on which noise is estimated in the frequency domain and a first time interval between estimations in the time domain;
when the dominant noise type is determined to be non-platform noise that originates external to the apparatus, estimate the noise covariance matrix using a second frequency interval and a second time interval, wherein the first frequency interval is different from the second frequency interval or the first time interval is different from the second time interval; and
reduce the one or more noise interferences based on the estimated noise covariance matrix.

2. The apparatus of claim 1, wherein the one or more noise interferences comprises one or more of a clock noise, a spur noise, or a thermal noise.

3. The apparatus of claim 2, wherein the apparatus is a first station in a wireless network, and wherein the one or more noise interferences further comprises an external noise from a second station in the wireless network.

4. The apparatus of claim 1, wherein the receiver to optimize the noise covariance matrix estimation based on the dominant noise type is to:
estimate the noise covariance matrix from every tone in a frequency domain of a frame in response to a determination that the dominant noise type is platform noise.

5. The apparatus of claim 1, wherein the receiver to optimize the noise covariance matrix estimation based on the dominant noise type is to:
in response to a determination that the dominant noise type is non-platform noise, estimate the noise covariance matrix from a subset of less than all tones of a frame; and
track the one or more noise interferences over time in the frame.

6. The apparatus of claim 1, wherein the apparatus is operable at least in part with one of Institute of Electrical and Electronics Engineers (IEEE) 802.16e standard, 802.16m standard, or a 3rd Generation Partnership Project (3GPP) Long Term Evolution standard.

7. The apparatus of claim 1, wherein the first frequency interval is smaller than the second frequency interval.

8. The apparatus of claim 1, wherein the first time interval is longer than the second time interval.

9. An apparatus comprising:
a detection module to determine a type of a noise;
logic coupled with the detection module to:
when the type of the noise is determined to be platform noise that originates from the apparatus, estimate a spatial correlation matrix between two or more receive antennas using a first frequency interval between frequencies on which noise is estimated in the frequency domain and a first time interval between estimations in the time domain; and
when the type of the noise is determined to be non-platform noise that originates external to the apparatus, estimate the spatial correlation matrix using a second frequency interval and a second time interval, wherein the first frequency interval is different from the second frequency interval or the first time interval is different from the second time interval; and
a whitener module coupled with the logic to whiten the noise based on the estimated spatial correlation matrix between the two or more receive antennas.

10. The apparatus of claim 9, wherein the noise comprises a clock noise, a spur noise, or a thermal noise.

11. The apparatus of claim 10, wherein the apparatus is a first station in a wireless network, and wherein the noise interference further comprises an external noise from a second station in the wireless network.

12. The apparatus of claim 9, wherein the logic coupled with the detection module to estimate the spatial correlation matrix between the two or more receive antennas based on the type of the noise is to:
when the type of the noise is determined to be platform noise, estimate the spatial covariance matrix on every preamble tone or pilot tone in the frequency domain.

13. The apparatus of claim 9, wherein the logic coupled with the detection module to estimate the spatial correlation matrix between the two or more receive antennas based on the type of the noise is to:
when the type of the noise is determined to be non-platform noise, estimate the spatial covariance matrix on a subset of less than all preamble tones or pilot tones in the frequency domain; and track the noise over time.

14. The apparatus of claim 9, wherein the apparatus is operable at least in part with one of Institute of Electrical and Electronics Engineers (IEEE) 802.16e standard, 802.16m standard, and a 3rd Generation Partnership Project (3GPP) Long Term Evolution standard.

15. A method comprising:
determining, by a receiver, a type of a dominant noise among one or more noise interferences;
optimizing the estimation, by the receiver, of a noise covariance matrix based on the type of the dominant noise, wherein the optimizing includes:
when the type of the dominant noise is determined to be platform noise that originates from a platform comprising the receiver, estimating a noise covariance matrix using a first frequency interval between frequencies on which noise is estimated in the frequency domain and a first time interval between estimations in the time domain; and
when the type of the dominant noise is determined to be non-platform noise that originates external to the platform, estimating the noise covariance matrix using a second frequency interval and a second time interval, wherein the first frequency interval is different from the second frequency interval or the first time interval is different from the second time interval; and
whitening, by a receiver, the dominant noise based on the estimated noise covariance matrix.

16. The method of claim 15, wherein the one or more noise interferences comprises one or more of a clock noise, a spur noise, and a thermal noise.

17. The method of claim 16, wherein the receiver is part of a first station in a wireless network, and wherein the one or more noise interferences further comprises an external noise from a second station in the wireless network.

18. The method of claim 15, wherein optimizing the estimation, by the receiver, of the noise covariance matrix comprises:
when the type of the dominant noise is determined to be platform noise, estimating the noise covariance matrix from every preamble tone or pilot tone in the frequency.

19. The method of claim 15, wherein optimizing the estimation process, by the receiver, of the noise covariance matrix comprises:
when the type of the dominant noise is determined to be non-platform noise, estimating the noise covariance matrix on a subset of less than all preamble tones or pilots tones; and tracking the dominant noise over time.

20. The method of claim 15, wherein the receiver is operable at least in part with one of Institute of Electrical and Electronics Engineers (IEEE) 802.16e standard, 802.16m standard, and a 3rd Generation Partnership Project (3GPP) Long Term Evolution standard.

* * * * *